United States Patent [19]

Hirmann

[11] 4,090,431
[45] May 23, 1978

[54] BLADDER FOR FORCE TRANSMISSION APPARATUS

[75] Inventor: Georg Hirmann, Zurich, Switzerland

[73] Assignee: Rudolf Felix Homberger, Schaffhausen, Switzerland

[21] Appl. No.: 665,719

[22] Filed: Mar. 10, 1976

[51] Int. Cl.² .......................... F01B 19/00; F16J 3/02
[52] U.S. Cl. .................................................. 92/92
[58] Field of Search ............... 92/89, 90, 91, 92; 428/138, 195, 35, 59, 66

[56] References Cited

U.S. PATENT DOCUMENTS

| 2,522,401 | 9/1950 | Rava | 92/90 |
| 2,981,234 | 4/1961 | Appleton | 92/92 |
| 3,062,153 | 11/1962 | Losey | 92/92 |
| 3,585,905 | 6/1971 | Mason | 92/100 |
| 3,732,888 | 5/1973 | Convain | 92/92 |
| 3,848,516 | 11/1974 | Merriman | 92/92 |
| 3,924,518 | 12/1975 | Eberhard | 92/45 |

FOREIGN PATENT DOCUMENTS

| 1,222,065 | 2/1971 | United Kingdom | 92/90 |

*Primary Examiner*—Martin P. Schwadron
*Assistant Examiner*—Abraham Hershkovitz
*Attorney, Agent, or Firm*—Pennie & Edmonds

[57] ABSTRACT

An improved inflatable bladder for use in force transmission apparatus comprises a pair of flexible sheets peripherally joined together, one of such sheets having therein an opening for admission to and discharge from between the sheets of an inflating fluid, the periphery of the sheets having a contour which is at least in part concave toward the bladder center.

2 Claims, 8 Drawing Figures

BLADDER FOR FORCE TRANSMISSION APPARATUS

NATURE AND STATEMENT OF THE INVENTION

My copending application Ser. No. 458,008, filed Apr. 4, 1974, issued as U.S. Pat. No. 3,975,989, on Aug. 24, 1976 describes a pressure responsive force transmission apparatus comprising a base plate and a lift element with a bellows or a bladder arranged between them and which upon inflation moves them apart. A plurality of such units may be assembled together in parallel for force amplification or in series for force multiplication.

There are two basic designs of bladders for use in such devices. One design includes bladders which for the most part have their peripheral edges held taut or otherwise substantially restrained. Expansion of such bladders can take place only by stretching of the bladder sheet material. The design and use of such bladders entail serious problems that have not been adequately solved, and their use has not progressed beyond the research stage. The other design includes bladders with at least a partially unrestrained periphery. Such bladders, at least in limited regions about the periphery, become wrinkled or otherwise deformed upon inflation. The present invention provides for a reduction in the stress involved in such wrinkling of the bladder material at the bladder periphery.

The invention provides an inflatable bladder adaptable for use in pressure responsive force transmission apparatus which in the deflated condition is essentially flat and which comprises a pair of flexible sheets or films peripherally joined together. One of such sheets has therein an opening for admission to and discharge from between the sheets of an inflating pressure fluid. In accordance with the invention, the periphery of the sheets has a contour which is at least in part concave toward the bladder center. One advantageous form of such bladder is four-cornered, with at least two oppositely disposed concave peripheral segments. Another advantageous form of bladder is approximately circular, with at least one concavely indented peripheral segment. Preferably, in the latter case, there are a plurality of concavely indented segments spaced uniformly about the bladder periphery; and those segments may alternate with a plurality of convexly curved segments. One specific advantageous bladder configuration has substantially the peripheral shape of a Maltese cross.

DESCRIPTION OF THE INVENTION

Figure 1:
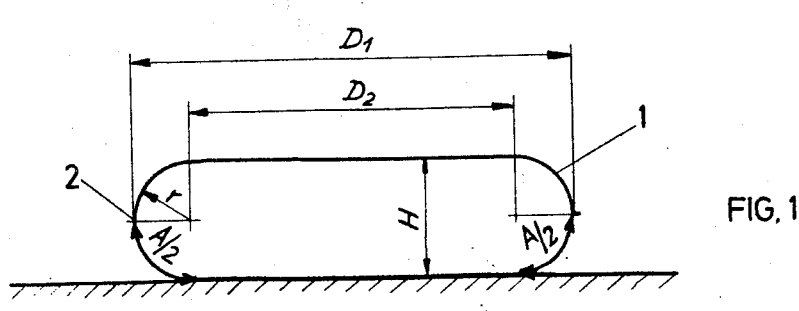
FIG. 1 is a representation of a circular bladder in the inflated (expanded) state.
Figure 2:
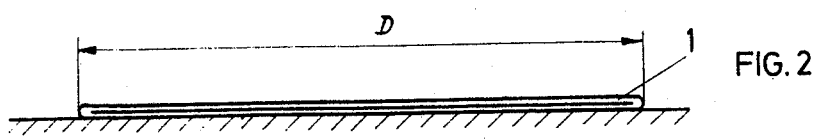
FIG. 2 shows the bladder of FIG. 1 in the deflated state.

FIGS. 1 and 2 show respectively a circular bladder in the inflated condition and in the flat, practically planar deflated state. So that the range of working pressures of the bladder 1 may be as high as possible, in contrast with the minimum pressure necessary for deformation, a flexible film or sheet having as high a tensile strength as possible should be selected for making the bladder. Choice of strong sheet materials is restricted, however, because on inflation to the outside diameter 2 of the bladder 1, there is a shortening of the periphery of the bladder which results in the formation of kinks or buckling at its outer edge. A strong bladder material resists such deformation and thus impedes inflation of the bladder.

If a constant area, nonstretchable bladder surface is assumed, then as the bladder is inflated the excess peripheral length of bladder material which collects as the bladder is inflated is proportional to the change in diameter.

With relationships as in FIGS. 1 and 2, $$A = H \cdot \pi/2 \text{ with } r = H/2 \tag{1}$$

$$D_2 = D - r \cdot \pi \tag{2}$$

$$D_1 = D_2 + 2r \tag{3}$$

The difference in periphery between the deflated and the inflated states are $$\Delta U = (D - D_1)\pi, \text{ and} \tag{4}$$

$$\Delta U \text{rel.} = \Delta U/\pi D = \pi(D - D_1) / \pi D_1 = D/D_1 - 1 \tag{5}$$

Figure 3:
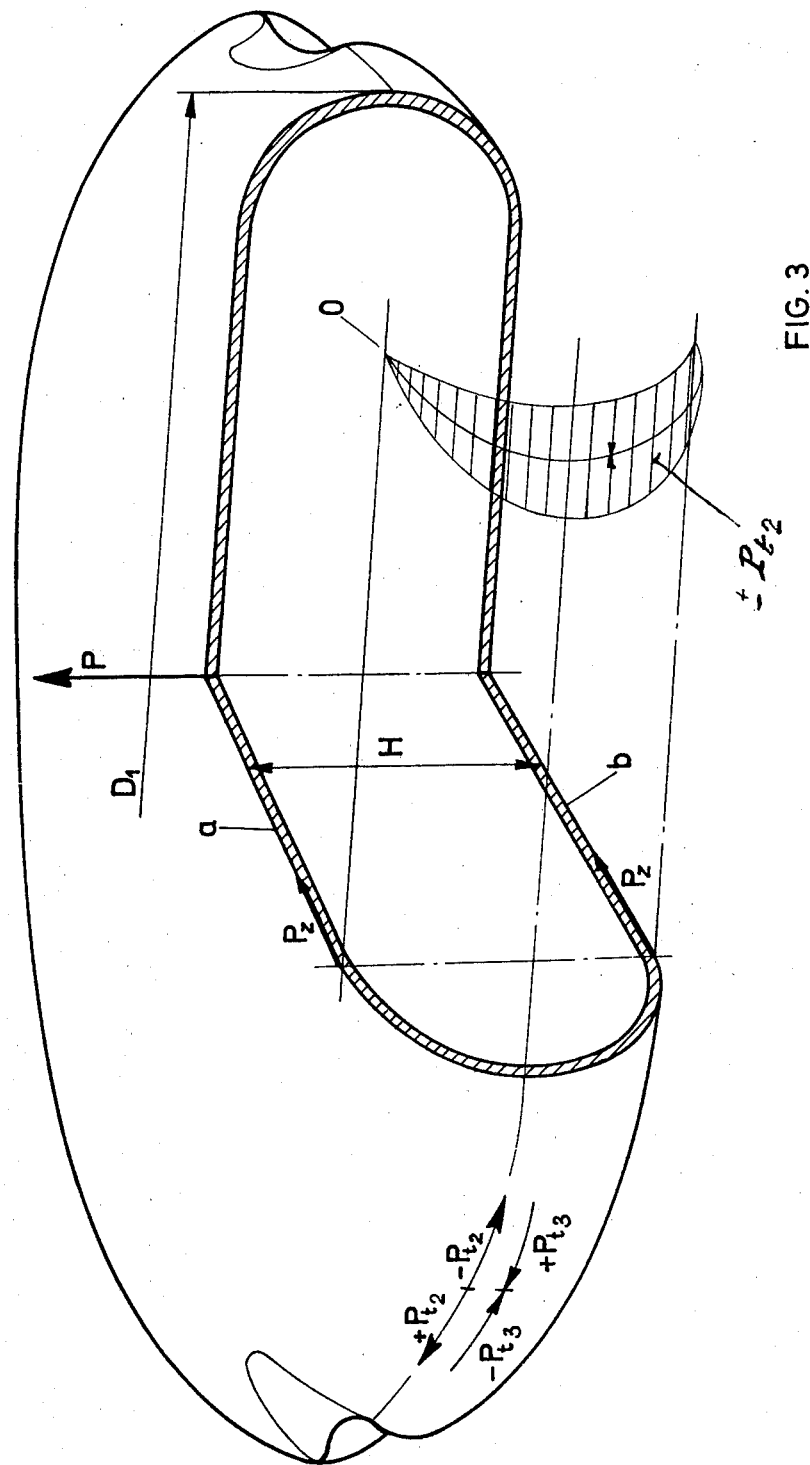
FIG. 3 shows the stress distribution on the unrestrained peripheral curvature of the bladder of FIG. 1, represented in perspective.

FIG. 3 shows the stress on the unrestrained bladder sheet or film. This stress results from three types of forces. One is the pressure $p$ of the pressure medium, directed perpendicular to the bladder sheet surface, which, per unit of width of the bladder, produces a tangential tensile force (for example, in kg/cm) of $$P_z = H \cdot p/2 \tag{6}$$

The second type of force is the force $P_{t2}$ directed tangentially to the polar axis P (at right angles to $P_z$) of the bladder. This should, in the case of wholly unrestrained bladders, represent the main force. In actual fact, however, because of friction on the active faces "a" and "b" (when the bladder is disposed between base and lift elements, as it is in use), and because of the tautness of the bladder material owing to $P_z$, no significant magnitude of force is here attained. This force at most has a value of $$P_{t2} \simeq P_z \cdot H/D_1 \tag{7}$$

The same relation is obtained if the ratio of the forces for a free surface of a homogeneous liquid is calculated.

It is therefore apparent that upon inflation of a freely deformable bladder, the diameter (D of FIG. 2) becomes smaller. This postulates an extension of the periphery, in order to consume the original peripheral length, for the excess material at the periphery certainly cannot disappear. Since at any pressure in excess of the pressureless uninflated state the peripheral length is greatest when the cell is but slackly expanded, only forces supplied by the bladder material itself can lengthen the bladder periphery, for the inner inflation pressure forces acting outwardly shorten the periphery. Hence it is logical that the peripheral line is driven inward in some places by these (the third type) forces, $P_{t3}$, originating in the bladder material, in order to restore the original peripheral length.

These relationships show that there are no forces, i.e., neither $P_{t2}$ nor $P_z$ working in opposition to inherent bladder material forces $P_{t3}$, which comes into play as excess peripheral lengths of bladder material accumulate. Hence, as the height H of the bladder increases with inflation, increasingly deeper or more numerous bends and wrinkles are formed in its periphery. These deformations may lead to early damage to the bladder material. They normally form at the weakest points of such material, in the region where the greatest excess peripheral lengths develop.

The patterns of the forces $P_{t2}$ around the curvature at the edge of the inflated bladder is illustrated graphically in FIG. 3. Also the occurrence of deformations that occur at the periphery of the inflated bladder are schematically portrayed in FIG. 3.

In accordance with the invention, the peripheral shape of the bladder is altered from the conventional circular or other uniformly convex (toward the bladder center) shape, to enable the bladder periphery readily to consume excess peripheral length produced as the bladder is inflated. This is done by forming the periphery of the bladder with appropriately located segments which in plan are concave toward the bladder center. As noted above, this may be done by making the bladder four-cornered, with two opposite sides, or all sides, concave. Particularly advantageous bladder configurations are shown in FIGS. 4 and 5.

Figure 4:
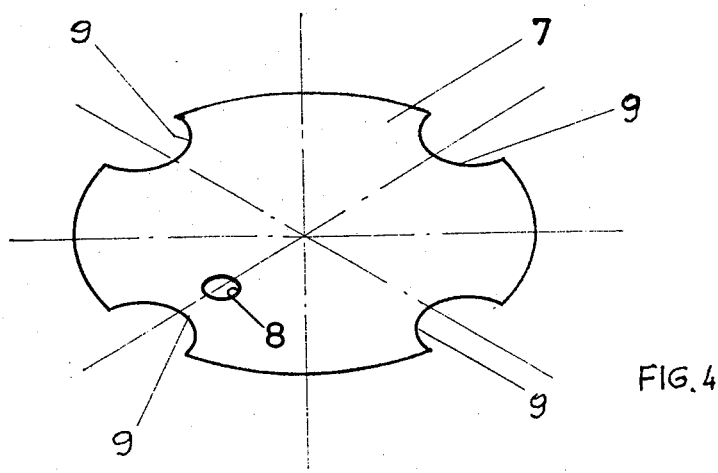
FIG. 4 shows a generally circular bladder according to the invention with convex-concave peripheral edge shape.

As shown in FIG. 4, the bladder 7 when deflated is a flat planar structure of two peripherally joined layers or sheets, in one of which is formed an opening 8 (FIG. 6) to admit or discharge inflating fluid to or from between the sheets. The periphery of the bladder 7 is configured at a plurality of points to form segments 9 which are concave toward the bladder center. These concave segments 9 serve as buffer sections which take up the excess length of periphery accumulating at the outside diameter of the bladder 7 on inflation. In between the segments 9 the periphery of the bladder is convex toward the center. In stacked force generator assemblies employing several bladders, the concave peripheral segments may receive force couple members joining lift elements together, making possible force generator packages of a compact, cylinder-like design.

The concave peripheral parts 9 preferably are distributed uniformly about the periphery of the bladder. Their preferable number and size is dependent upon the extensibility of the bladder material and the intended maximum bladder expansion.

Figure 5:
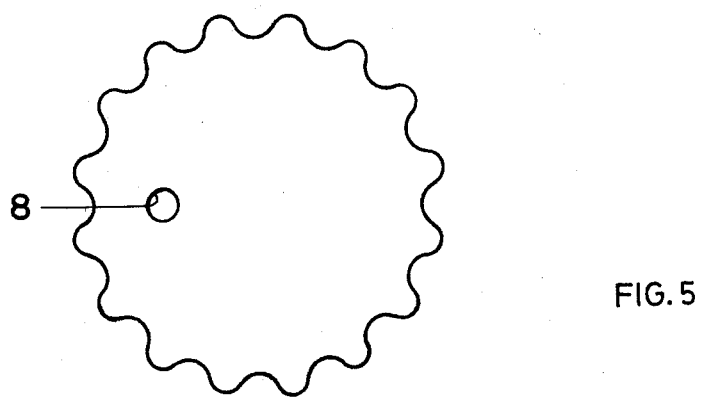
FIG. 5 shows a bladder similar to that of FIG. 4, with a wave-shaped concave-convex periphery.

FIG. 5 shows an embodiment of the bladder, of the same basic construction as shown in FIG. 4, in which shortening of the periphery is compensated for by a wave-shaped arrangement of concave-convex peripheral segments.

Figure 6:
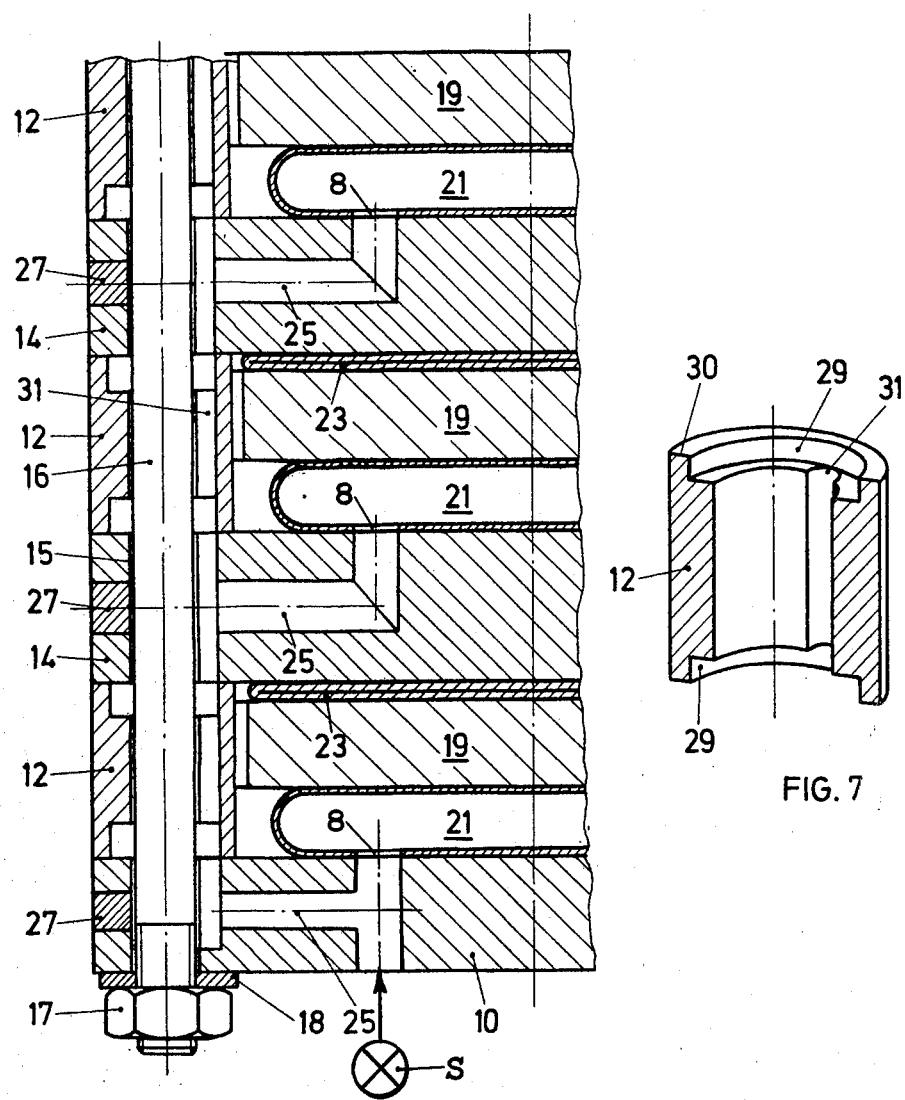
FIG. 6 is a longitudinal fragmentary section through a multi-stage-double-acting force generator utilizing bladders according to the invention.
Figure 7:
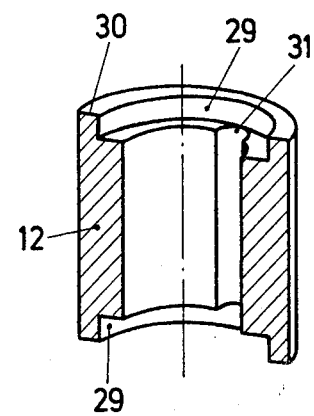
FIG. 7 is a sectional view of a channel spacer block, shown in sectional perspective, employed in the apparatus of FIG. 6.
Figure 8:
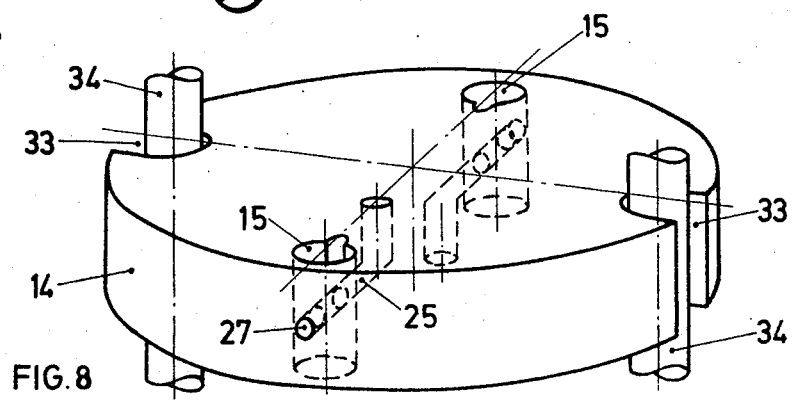
FIG. 8 is a view of a stationary intermediate plate used in the apparatus of FIG. 6, shown in perspective and in relation to movable plate tie rods.

FIGS. 6 to 8 exemplify use of the new bladder in force transmission appparatus. The apparatus shown in section in FIG. 6 comprises a cylindrical bottom plate 10. Mounted above the bottom plate, and spaced therefrom and from each other by channel spacer blocks 12, are a series of fixed intermediate plates 14. The bottom plate 10, the spacer blocks 12, and the intermediate plates 14 are provided with bores 15 which receive tie rods (only one is shown), the ends of which are provided with nuts 17 and washers 18 (only the lowers one of which are shown) to clamp the assembly of plates 10, 14 and blocks 12 tightly together.

Between the bottom plate 10 and the adjacent intermediate plate 14, and between each pair of intermediate plates 14, a movable plate 19 is disposed for axial movement relative to the fixed plates. Bladders 21 and 23 are disposed one adjacent each face of the movable plates. Pressure fluid inlet and outlet bores 25 are formed in the fixed plates 10 and 14, as well as in the channel spacer blocks 12. These bores communicate through the bladder openings 8 with the bladder interiors, and with a valved source S of inflating fluid. The bores (FIG. 6) are sealed off air-tight (at the edges of the plates 10 and 14) by means of plugs 27. The movable plates 19 are held together and supported by means of tie rods 34, which pass through corresponding recesses 33 of the stationary plates 10 and 14 disposed 90° away from the tie rods 16, as seen in FIG. 8. Thus all the movable plates 19 move together as a unit relative to the stationary plates 10 and 14. A force transmission apparatus of similar design is shown and described in detail in my aforementioned copending application.

As shown in detail in FIG. 7, the channel spacer blocks 12 are provided with upper and lower grooves 29 and a longitudinal connecting channel 31, for transmission through the system of inflation fluid from the source S. Sealing surfaces 30 make pressure tight joints with adjacent parts.

The bladders 21 and 23 are designed as described above with reference to FIGS. 4 or 5. The concave peripheral contours of these bladders are suitably positioned to accommodate the tie rods 16 and 34.

Inflation pressure medium, i.e. compressed air or other fluid under pressure, supplied from the valved source S, passes through the channels 25, 29, 31 to inflate the bladders 21 adjacent the lower surface of the movable plates 19 and lift the assembly of these plates which are connected together by means of the rods 34. Through suitable linkage (not shown) such movement of the movable plate assembly may be transmitted to any chosen mechanism. In order to return this movable plate assembly 19 to its starting position, the inflation pressure medium may be released from the bladders 21, and by a similar arrangement of channels (not shown in FIG. 6 but indicated in FIG. 8) the bladders 23 adjacent the upper surface of the movable plates 19 may be inflated to press the assembly of movable plates 19 back to the starting position. The bladders 21 are concurrently flattened, as the pressure medium escapes through the inlet and the outlet bores 25.

The bladder design of this invention, because of the essentially smaller stress on the peripheral locations of the concave contour, provides for a considerably longer useful bladder life, and allows the opportunity for a more suitable selection of bladder sheet material, than has been possible heretofore.

I claim:

1. An inflatable bladder adaptable for use in a pressure responsive force transmission apparatus, said bladder comprising in combination, a pair of flat flexible sheets having a planar surface and disposed one atop another, one of said sheets having an opening in the planar surface for admission to and discharge from between said sheets of an inflating pressure fluid, said pair of flat flexible sheets being joined together about a common peripheral edge, the peripheral edge defining a circular configuration having at least four uniformly disposed substantially identical indentations positioned concave relative to the center of the bladder, said concave indentations providing buffer sections which take up an excess length of the periphery accumulating at the outside diameter of the bladder on inflation.

2. The bladder of claim 1 having four concave indentations.

* * * * *